Jan. 15, 1935.  L. GALINDO  1,988,352
AUTOMOBILE WHEEL
Filed July 9, 1934
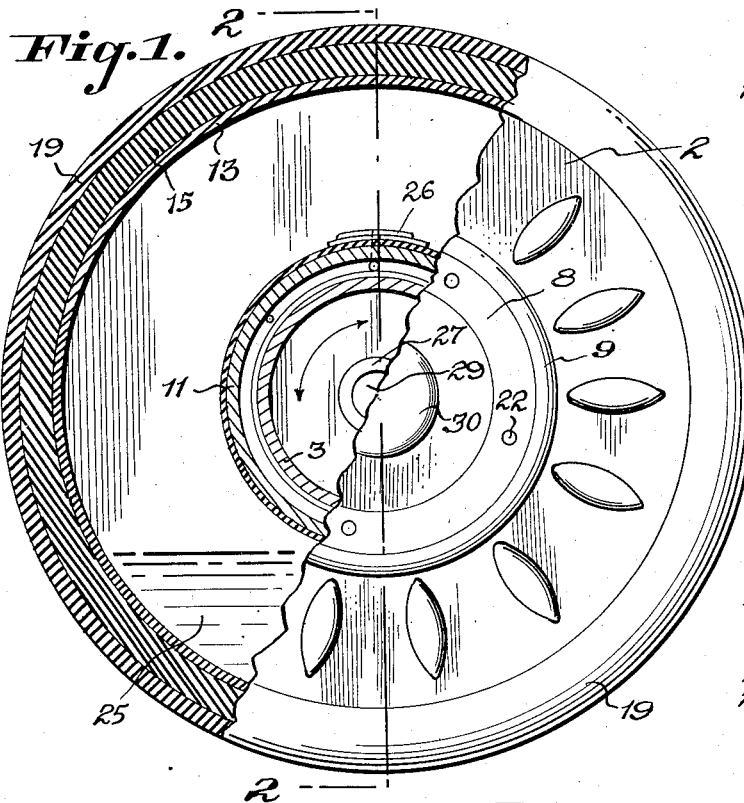
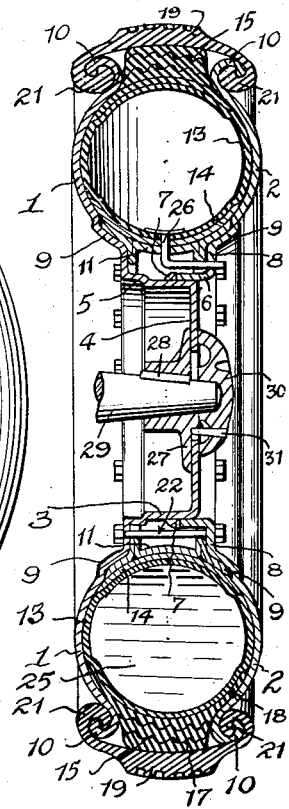
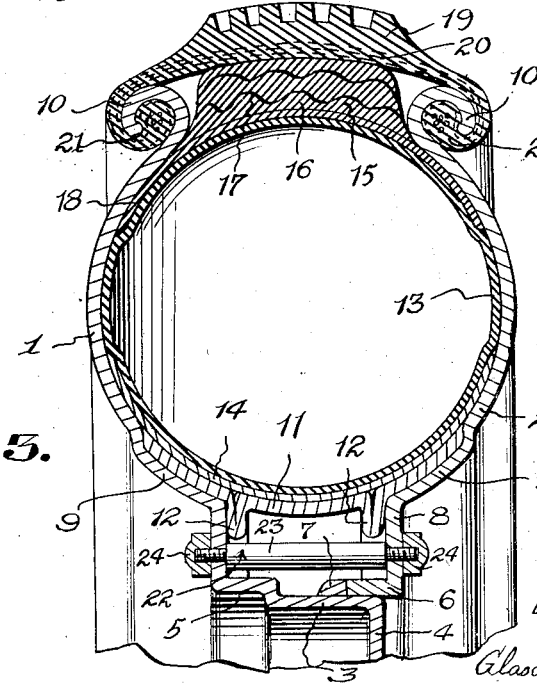
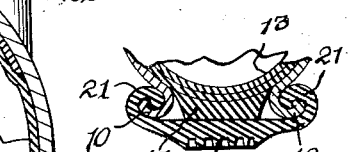
Inventor:
L. Galindo
By:
Glascock, Broning & Seebold
Attys Patented Jan. 15, 1935

1,988,352

UNITED STATES PATENT OFFICE 1,988,352

AUTOMOBILE WHEEL

Luis Galindo, Santiago, Chile

Application July 9, 1934, Serial No. 734,390

4 Claims. (Cl. 152—10)

The present invention has reference generally to improvements in vehicle wheels and more particularly relates to an improved resilient tire.

The invention, as its primary aim and object contemplates the provision of a device of the above character embodying a metallic casing, a pneumatic tube and tread members associated with the tube and the casing in such manner as to effectively and yieldably support a wheel, the arrangement of the parts being such that even should the tube become deflated there will be no material collapsing of the tire proper thereby enabling the operator of the machine to still maintain control thereof without materially reducing the speed of the vehicle.

As an equally important object the invention contemplates the provision of a device of the above mentioned character in which the metallic casing parts are constructed and arranged so that one at least may be readily detached to permit of the replacement of the tube while in addition the parts are designed to cooperate with the tread members and the tube so that compression of the latter takes place radially.

More particularly the present invention consists in the provision of a device of the above character wherein novel means is employed for maintaining the parts or sections of the metallic casing in proper spaced relation with respect to each other in combination with means for detachably fastening the said parts together.

Additional objects of the present invention consists in the provision of a device of the above character wherein one of the metallic parts of the tire casing may be constructed integrally with a disc wheel; improved means detachably fastening the wheel on the axle; shaping the disc wheel so as to provide a brake drum and utilizing a chemical composition within the tube for reducing the possibility of blowouts.

Other objects as well as the nature, characteristic features and scope of the invention will be more readily apparent from the following description taken in connection with the accompanying drawing and pointed out in the claims forming a part of this specification.

The invention is clearly illustrated in the accompanying drawing, in which:—

Fig. 1 is a side elevational view of the improved device partly broken away and shown in circumferential section, Fig. 2 is a vertical transverse sectional view through a complete wheel showing particularly the construction of the improved tire, Fig. 3 is an enlarged transverse sectional view through the tire, and Fig. 4 is a fragmentary sectional detail.

Similar characters of reference are employed in all of the above described views to indicate corresponding parts.

Referring now, more particularly, to the accompanying drawing there is provided a metallic casing consisting of a fixed part 1 and a detachable part 2, the fixed part 1 being provided with a felly portion 3 formed integral with or fixed to a wheel 4. As shown the felly portion is integral with the wheel though it is perfectly obvious that this part can be fixed on a conventional type of wheel.

The fixed part 1 is offset laterally adjacent the felly as indicated at 5 while the inner portion of the removable part 2 is extended inwardly to form an annular flange 6 which is telescoped about the felly engaging portion 3 of the main part 1, inward movement being limited by a circumferential rib 7 on the felly portion. The main portions of both of the parts 1 and 2 are curved arcuately outwardly in opposite directions being offset adjacent their inner parallel portions 8 to provide circumferential seats 9 for a purpose hereinafter set forth. The outer portions of the parts 1 and 2 are curved outwardly to provide annular rim flanges 10.

In order to maintain the parts 1 and 2 of the casing in proper position a metallic retaining and spacing band 11 is provided. This circumferential band is provided adjacent the side edges and on its inner surface with circumferential flanges 12 arranged parallel to each other and adapted to be arranged adjacent the inner surfaces of the parallel portions 8 of the parts 1 and 2 when the retaining and spacing band is seated in the circumferential seats 9. The circumferential band 11 is curved transversely preferably corresponding to the complementally curved main portions of the parts or sections 1 and 2.

A pneumatic tube 13 is arranged within the casing and on the band, a protecting band 14 of suitable flexible material being arranged on the outer surface of the band and over the meeting edges of the bands with the seats to avoid pinching of the tube.

An inner tread member 15 including substantially a thick body of soft rubber 16 suitably reinforced as at 17 is arranged between the rim flanges 10 and terminates in thin flexible marginal portions 18 which lie between the tube and the inner surface of the curved portions of the parts 1 and 2 of the casing as clearly shown in Fig. 3. A main or outer tread member 19 suitably reinforced as at 20 is now provided and terminates in inwardly extending annular beads 21 which are detachably engaged with the inner surfaces of the rim flanges. This tread member is normally held extended when the tube is compressed by the pressure of the inner tread member thereagainst. In the event however of a puncture of the inner tube the outer tread member is compressed inwardly only a slight extent where it is supported by the rim flanges and serves to support the vehicle wheel in such manner that there is no danger of the motor vehicle getting out of the control of the operator due to the collapsing of the inner tube.

Cooperating with the spacing and retaining band 11 is improved fastening means generally designated 22 for removably clamping the parallel side portions 8 against the flanges 12 and the flange 6 against the stop rib 7. This fastening means may consist of a bolt 23 having the respective ends reduced to leave shoulders and the projecting ends threaded and arranged through opposed openings in the parallel portions 8, the outer ends of the same being movably engaged by clamping nuts 24.

In order to reduce the possibility of blowouts due to overheating it has been found expedient to inject a certain amount of suitable glycerin composition 25 within the tube. This may be injected through a suitable valve inlet 26 also utilized for injecting air in a conventional manner.

Although the tire may be mounted on a felly of a conventional wheel as stated in the present instance it has been found desirable to construct the felly portion integral with a disc wheel. A suitable means such as a hub 27 may be provided to support the wheel said hub being preferably keyed as at 28 to the rear axle 29 while a cap 30 is engaged about the projecting end of the hub and is suitably secured as by a detachable fastener 31 in such manner as to effectively and releasably clamp the body portion of the wheel to the hub as shown in Fig. 2.

It is believed in view of the foregoing that a detailed description of the operation of the invention is entirely unnecessary. Likewise it is believed that the advantages of the invention will be readily apparent.

Having thus fully described the invention what is claimed as new and desired to be secured by Letters Patent is:—

1. In a resilient tire, a metallic casing comprising a part having a felly forming portion and a tube enclosing portion extending outwardly from said felly portion, a detachable part having a felly forming portion and a corresponding tube enclosing portion, a metallic spacing band between said parts having its margins overlying said tube enclosing portions and engaging seats formed therein, said seats and said band being so constructed and arranged that when assembled a continuous unbroken tube engaging surface is formed thereby, means on said band to engage the felly portions to hold them in spaced relation and means to detachably secure said parts in assembled relation.

2. In a resilient tire, a metallic casing including a fixed part and a detachable part, a felly portion integral with the fixed part, an annular flange integral with the inner end of the detachable part and seated on the felly portion of the fixed part, both of said parts having inner parallel portions and transversely curved outer portions, rim engaging flanges at the outer edges of said parts, both of said parts being provided adjacent their parallel portions with internal circumferentially extending seats, a spacing and retaining band provided on its inner surface with spaced flanges engageable with the inner surfaces of the parallel portions of the parts when the band is engaged with the seats, and fastening means removably mounted transversely of the parallel portions for detachably clamping the parts together and against the spacing band.

3. In a resilient tire as claimed in claim 2, a circumferential rib on the outer surface of the felly portion acting as a stop for the inner edge of the flange on the detachable part.

4. In a resilient tire, a metallic casing including a fixed part and a detachable part, a felly portion integral with the fixed part, an annular flange integral with the inner end of the detachable part and seated on the felly portion of the fixed part, both of said parts having inner parallel portions and transversely curved outer portions, rim engaging flanges at the outer edges of said parts, both of said parts being provided adjacent their parallel portions with internal circumferentially extending seats, a spacing and retaining band provided on its inner surface with spaced flanges engageable with the inner surfaces of the parallel portions of the parts when the band is engaged with the seats, a pneumatic tube arranged between the parts and about the spacing band, an annular flexible strip interposed between the tube and band, an inner tread member surrounding the tube and positioned between the rim flanges on the said parts, and an outer tread provided with internal beaded edges detachably engaged with the rim flanges when the outer tread member is arranged thereabout.

LUIS GALINDO.